US009871857B2

(12) United States Patent
Russinovich et al.

(10) Patent No.: US 9,871,857 B2
(45) Date of Patent: Jan. 16, 2018

(54) OPTIMAL ALLOCATION OF DYNAMIC CLOUD COMPUTING PLATFORM RESOURCES

(71) Applicant: MICROSOFT TECHNOLOGY LICENSING, LLC, Redmond, WA (US)

(72) Inventors: Mark Eugene Russinovich, Hunts Point, WA (US); James E. Johnson, Bellevue, WA (US); Ajay Mani, Woodinville, WA (US); Bryan Tuttle, Newcastle, WA (US); Alejandro Matute Gonzalez, Seattle, WA (US); Huy Vu-Bao Hoang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 14/699,673

(22) Filed: Apr. 29, 2015

(65) Prior Publication Data

US 2016/0323374 A1 Nov. 3, 2016

(51) Int. Cl.
*H04L 29/08* (2006.01)
*G06F 3/06* (2006.01)
*G06F 9/50* (2006.01)

(52) U.S. Cl.
CPC ........ *H04L 67/1025* (2013.01); *G06F 3/0604* (2013.01); *G06F 3/067* (2013.01);
(Continued)

(58) Field of Classification Search
USPC ....... 709/217, 218, 220, 221, 203, 206, 219, 709/223, 224, 226, 228, 231, 232, 238;
(Continued)

(56) References Cited

U.S. PATENT DOCUMENTS 6,990,666 B2   1/2006  Hirschfeld et al.
8,024,306 B2   9/2011  Palliyil et al.
(Continued)

FOREIGN PATENT DOCUMENTS

WO    2014147000 A1    9/2014

OTHER PUBLICATIONS

"International Search Report and Written Opinion Issued in PCT Application No. PCT/US2016/029406", dated Jul. 27, 2016, 12 Pages.
(Continued)

*Primary Examiner* — Quang N Nguyen
(74) *Attorney, Agent, or Firm* — Shook, Hardy & Bacon L.L.P.

(57) ABSTRACT

In various embodiments, methods and systems for optimizing allocation of dynamic resources are provided. A user service request resource instance is received at an allocator. The user service request resource instance is based on a dynamic resource protocol that supports generating and communicating resource instances between components in a resource allocation platform. The dynamic resource protocol also defines a set of rules for translating and representing resources as logical resource types and logical units. At a node, a node resource instance is generated and communicated, based on the dynamic resource protocol, from the node to the allocator. The node resource instance specifically comprises a resource interaction matrix that indicates dependencies between resource types. A resource allocation instance is generated at the allocator for the user service request resource instance. The resource allocation instance is communicated, such that, resource types on the node are allocated based on the resource allocation instance.

20 Claims, 11 Drawing Sheets

(52) U.S. Cl.
CPC .......... *G06F 3/0631* (2013.01); *G06F 9/5061* (2013.01); *G06F 9/5077* (2013.01); *H04L 67/10* (2013.01)

(58) Field of Classification Search
USPC .................................................. 715/700; 1/1
See application file for complete search history.

(56) References Cited

U.S. PATENT DOCUMENTS

| | | | |
|---|---|---|---|
| 8,032,634 B1 | 10/2011 | Eppstein et al. | |
| 8,335,851 B1 | 12/2012 | Vendrow | |
| 8,584,130 B2* | 11/2013 | Abbondanzio | G06F 9/5077 715/700 |
| 8,607,242 B2 | 12/2013 | Clarke | |
| 8,990,365 B1* | 3/2015 | Banda | H04L 41/04 709/221 |
| 9,026,609 B2* | 5/2015 | Oliver | G06F 9/5072 709/217 |
| 9,626,262 B1* | 4/2017 | Vogel | H04L 43/0805 |
| 2002/0120744 A1 | 8/2002 | Chellis et al. | |
| 2008/0052719 A1 | 2/2008 | Briscoe et al. | |
| 2009/0113021 A1* | 4/2009 | Andersson | H04L 29/12783 709/218 |
| 2012/0198073 A1 | 8/2012 | Srikanth et al. | |
| 2012/0331113 A1* | 12/2012 | Jain | G06F 9/5072 709/220 |
| 2013/0212279 A1 | 8/2013 | Dutta et al. | |
| 2014/0181829 A1 | 6/2014 | Hathaway et al. | |

OTHER PUBLICATIONS

Dong, et al., "Unified Dynamic Resource Supply Model to Support Cyber Physical System", In Proceedings of the International MultiConference of Engineers and Computer Scientists 2014 vol. II, Mar. 12, 2014, 6 pages.

Hachicha, et al., "Towards Resource-aware Business Process Development in the Cloud", Jul. 22, 2014, 15 pages.

Yin, et al., "A Better Way to Negotiate for Testbed Resources", In Proceedings of 2nd ACM SIGOPS Asia-Pacific Workshop on Systems, Jul. 11, 2011, 5 pages.

"International Preliminary Report on Patentability Issued in PCT Application No. PCT/US2016/029406", dated Apr. 7, 2017, 5 Pages.

* cited by examiner

| Resource Label | Total Allocable Capacity | Free Allocable Capacity | Dependency Matrix ||||| Existing Allocations ||
|---|---|---|---|---|---|---|---|---|---|
| | | | CPU_ACU | RAM_GB | GPU_ACU | NIC_GHZ | VM | Guid1 | Guid2 |
| CPU_ACU | 32.0 | 15.8 | 1 | - | - | - | - | 10.1 | 6.1 |
| RAM_GB | 256.0 | 128.0 | - | 1 | - | - | - | 92.0 | 36.0 |
| GPU_ACU | 10.0 | 10.0 | Decrement by 5.0 | - | 1 | - | - | 0.0 | 0.0 |
| NIC_GHZ | 20.0 | 5.0 | - | - | - | 1 | - | 10.0 | 5.0 |
| VM | 32.0 | | Decrement by 0.1 | - | - | - | 1 | 1.0 | 1.0 |

FIG. 2

| Feature | Compute 3.0.2 |
|---|---|
| Role | Compute |
| Processor | 2 x E5-2660 2.2 GHz |
| Memory | 128 GB |
| Flash Store | None |
| HDD | 1 x 4 TB 7200 LFF SATA |
| Array Controller | LSI 9210 8I Dell |
| RAID Level | None |
| SSD | 6 x 400GB eMLC |
| 1GbE Network | None |
| 10GbE Network | 1 port on Mellanox CX3 Pro |
| 40GbE Network | None |
| Physical Cores / Node | 16 |
| Nodes per rack US | 44 |
| Nodes per rack Intl | 40 |
| Racks per Cluster US | 20 |
| Racks per Cluster Intl | 20 |
| Fibre Controller | None |
| TOR | Arista 7050QX32 40Gb x 32 |
| Cluster Spine | Arista 7050QX32 40Gb x 32 |

FIG. 3

| Resource Label | Standard and High Memory Offerings | | | | | | | |
|---|---|---|---|---|---|---|---|---|
| | XSmall | Small | Medium | Large | XLarge | HiMemVM 1 | HiMemVM 2 | HiMemVM 3 | SQLG3 |
| Cpu ACU | 0.25 | 1 | 2 | 4 | 8 | 2 | 4 | 8 | 26.22 |
| Gpu ACU | 0 | 0 | 0 | 0 | 0 | 0 | 0 | 0 | 0 |
| Ram MB | 768 | 1792 | 3584 | 7168 | 14336 | 14336 | 28672 | 57344 | 114688 |
| Total Storage MB | 36864 | 49152 | 98304 | 196608 | 393216 | 98304 | 196608 | 393216 | 0 |
| Disk L0 MB (Min) | 0 | 0 | 0 | 0 | 0 | 0 | 0 | 0 | 1572864 |
| Disk L1 MB (Min) | 36864 | 49152 | 98304 | 196608 | 393216 | 98304 | 196608 | 393216 | 0 |
| Nic Bw Ghz | 5 | 100 | 200 | 400 | 1000 | 500 | 1000 | 2000 | 8000 |
| Spindle L0 | 0 | 0 | 0 | 0 | 0 | 0 | 0 | 0 | 0 |
| Spindle L1 | 0 | 0 | 0 | 0 | 0 | 0 | 0 | 0 | 0 |
| VM | 1 | 1 | 1 | 1 | 1 | 1 | 1 | 1 | 1 |

FIG. 4A

| Resource Label | Basic VMs Offerings | | | | |
|---|---|---|---|---|---|
| | B0 | B1 | B2 | B3 | B4 |
| Cpu ACU | 0.25 | 0.68 | 1.37 | 2.75 | 5.5 |
| Gpu ACU | 0 | 0 | 0 | 0 | 0 |
| Ram MB | 768 | 1792 | 3584 | 7168 | 14336 |
| Total Storage MB | 36864 | 41984 | 65536 | 131072 | 262144 |
| Disk L0 MB (Min) | 0 | 0 | 0 | 0 | 0 |
| Disk L1 MB (Min) | 36864 | 41984 | 65536 | 131072 | 262144 |
| Nic Bw Ghz | 5 | 100 | 200 | 400 | 800 |
| Spindle L0 | 0 | 0 | 0 | 0 | 0 |
| Spindle L1 | 0 | 0 | 0 | 0 | 0 |
| VM | 1 | 1 | 1 | 1 | 1 |

FIG. 4B

| Resource Label | SSD VMs Offerings | | | | | | | | |
|---|---|---|---|---|---|---|---|---|---|
| | SSDVm1 | SSDVm2 | SSDVm3 | SSDVm4 | SSDVm5 | SSDVm6 | SSDVm7 | SSDVm8 | SSDVm9 |
| Cpu ACU | 1.63 | 3.27 | 6.55 | 13.11 | 3.27 | 6.55 | 13.11 | 26.22 |
| Gpu ACU | 0 | 0 | 0 | 0 | 0 | 0 | 0 | 0 |
| Ram MB | 3584 | 7168 | 14336 | 28672 | 14336 | 28672 | 57344 | 114688 |
| Total Storage MB | 92160 | 184320 | 286720 | 491520 | 184320 | 286720 | 491520 | 901120 |
| Disk L0 MB (Min) | 92160 | 184320 | 286720 | 491520 | 184320 | 286720 | 491520 | 901120 |
| Disk L1 MB (Min) | 0 | 0 | 0 | 0 | 0 | 0 | 0 | 0 |
| Nic Bw Ghz | 500 | 1000 | 2000 | 4000 | 1000 | 2000 | 4000 | 8000 |
| Spindle L0 | 0 | 0 | 0 | 0 | 0 | 0 | 0 | 0 |
| Spindle L1 | 0 | 0 | 0 | 0 | 0 | 0 | 0 | 0 |
| VM | 1 | 1 | 1 | 1 | 1 | 1 | 1 | 1 |

FIG. 4C

| Resource Label | Total Allocable Capacity | Free Allocable Capacity | Notes |
|---|---|---|---|
| Cpu Mhz | 4400 | 4400 | |
| Gpu Mhz | 0 | 0 | Gen-3 has no GPUs |
| Ram MB | 131072 | 114708 | Reserved 16364 Mb for System |
| Total Storage MB | 6242304 | 6242304 | All SSD + HDD + spill over (0) capacity |
| Disk L0 MB | 2048000 | 2048000 | Reserved one SSD for system boot |
| Disk L1 MB | 4194304 | 4194304 | Assumes HDD is available for allocation requests |
| Nic Bw Mbps | 10000 | 8000 | Reserved 2Gbps for system |
| Spindle L0 | 5 | 5 | Exposes all five SSDs for spindles |
| Spindle L1 | 1 | 1 | Exposes the only HDD for spindles |
| System Disk MB | 409600 | 307200 | Reserved 100 Gb for system |
| VM | 48 | 48 | Limit the number of VMs that can be deployed in the host |
| DIP | 64 | 64 | Provided by Network Service Manager |

FIG. 5A

| Resource Label | Dependency Matrix | | | | | | | | | | | | Notes |
|---|---|---|---|---|---|---|---|---|---|---|---|---|---|
| | Cpu Ghz | Gpu Ghz | Ram MB | Total Storage MB | Disk L0 MB | Disk L1 MB | Nic Bw Mbps | Spindle L0 | Spindle L1 | System Disk | DIP | VM | |
| Cpu Ghz | 1 | | | | | | | | | | | | |
| Gpu Ghz | X | 1 | | | | | | | | | | | Gen3 has none |
| Ram MB | | | 1 | | | | | | | | | | |
| Total Storage MB | | | | 1 | | | | | | | | | |
| Disk L0 MB | | | | | 1 | | | | | | | | |
| Disk L1 MB | | | | | | 1 | | | | | | | |
| Nic Bw Mbps | | | | | | | 1 | | | | | | |
| Spindle L0 | | | | | 409600 | | | 1 | | | | | Every spindle is 1 less L0 disk |
| Spindle L1 | | | | | | 4194304 | | | 1 | | | | Every spindle is 1 less L1 disk |
| System Disk | | | | | | | | | | 1 | | | |
| DIP | | | | | | | | | | | 1 | | |
| VM | 0.1 | | 1024 | | | | | | | 81920 | 1 | 1 | Every VM needs DIP, CPU, memory and system disk |

FIG. 5B

US 9,871,857 B2

OPTIMAL ALLOCATION OF DYNAMIC CLOUD COMPUTING PLATFORM RESOURCES

BACKGROUND

Large-scale networked systems are commonplace platforms employed in a variety of settings for running applications and maintaining data for business and operational functions. For instance, a data center (e.g., physical cloud computing platform) may provide a variety of services (e.g., web applications, email services, search engine services, etc.) for a plurality of customers simultaneously. These large-scale networked systems typically include a large number of resources distributed throughout the data center, in which, each resource resembles a physical machine or a virtual machine (VM) running on a physical node or host. When the data center hosts multiple tenants (e.g., customer programs), these resources can be optimally allocated to the different tenants to improve operation of the cloud computing platform.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein provide methods and systems for optimizing allocation of dynamic resources. A user service request resource instance is received at an allocator. The user service request resource instance is based on a dynamic resource protocol that supports generating and communicating resource instances between components in a resource allocation platform. The dynamic resource protocol also defines a set of rules for translating and representing resources as logical resource types and logical units. At a node, a node resource instance is generated and communicated, based on the dynamic resource protocol, from the node to the allocator. The node resource instance specifically comprises a resource interaction matrix that indicates dependencies between resource types. A resource allocation instance is generated at the allocator for the user service request resource instance. The resource allocation instance is communicated such that resource types on the node are allocated based on the resource allocation instance.

BRIEF DESCRIPTION OF THE DRAWINGS

The present invention is described in detail below with reference to the attached drawing figures, wherein:

FIG. 2 is a schematic of an exemplary node resource instance having a resource interaction matrix, in accordance with embodiments described herein;

FIG. 3 is an exemplary description of a physical hardware resource, in accordance with embodiments described herein;

FIGS. 4A-4C are exemplary offerings in a cloud computing platform based on a physical hardware resource, in accordance with embodiments described herein;

FIGS. 5A and 5B are exemplary node resource instances, in accordance with embodiments described herein;

DETAILED DESCRIPTION

Figure 1A:
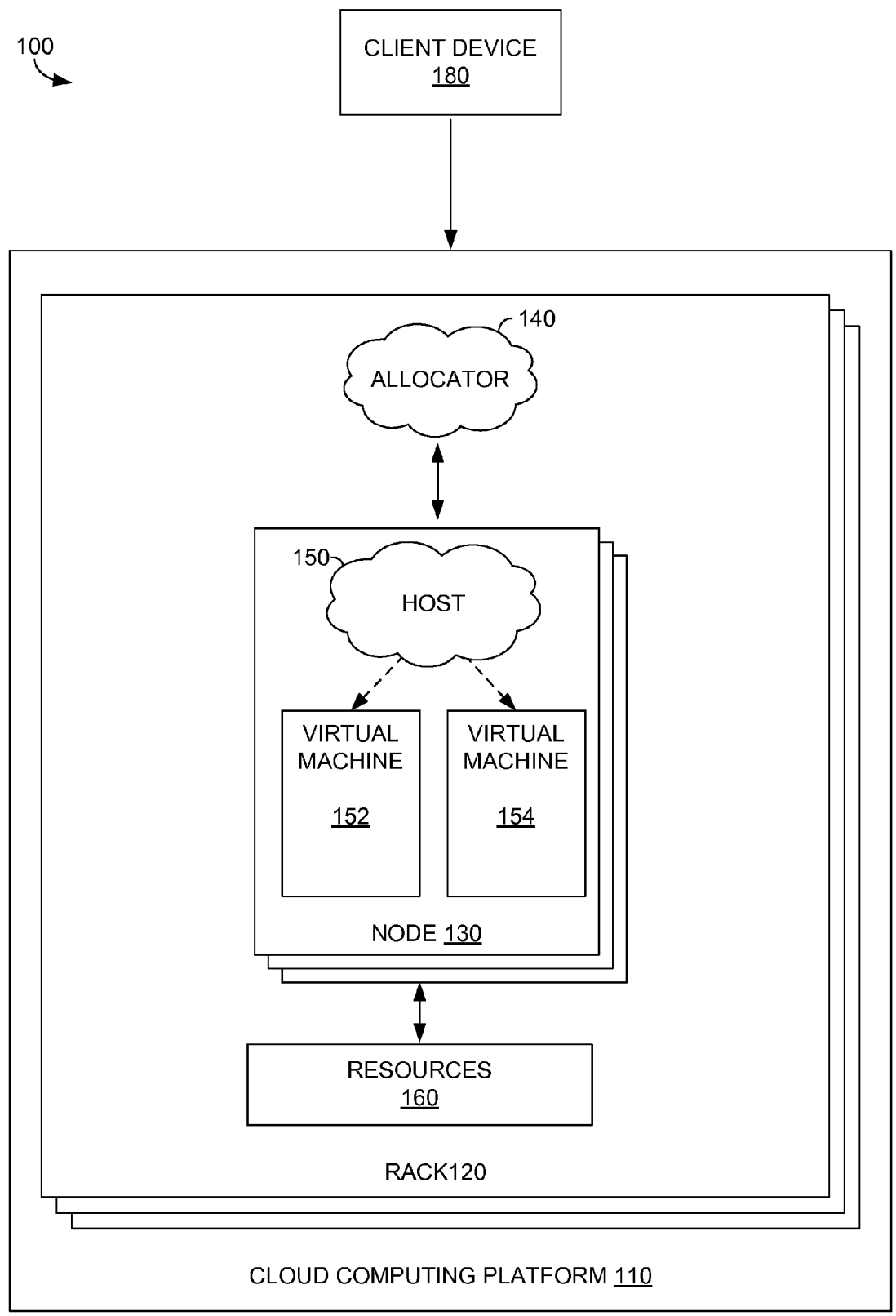
FIGS. 1A and 1B are block diagrams of an exemplary operating environment in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to distributed computing devices and components of a resource allocation platform that supports optimal allocation of dynamic resources based on a dynamic resource protocol. Components can be configured for performing novel aspects of embodiments, where configured for comprises programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

When a data center hosts multiple tenants associated with corresponding tenant programs, applications and services, these resources can be optimally allocated to the different tenants to improve operation of the cloud computing platform. By way of background, a cloud computing platform can provide different offerings of cloud computing services within a collection of nodes that are managed together. Offerings can refer to a combination of resources (e.g., CPU, GPU, Ram, Storage, etc.) which a tenant or user can request or select to run for their tenant infrastructure. Efficiently providing cloud computing resources to meet tenant service requests based on offerings can advantageously improve the operation of the cloud computing platform. Hindering the efficiency for cloud computing platform providers to support cloud computing platform offerings in a quick and reliable manner are the complex interactions between resources that correspond to different types of offerings.

Conventional systems resolve the resource allocation problem in several different ways. A cloud computing platform provider may support offerings based of containers (e.g., VMs) that are deployed in a host. For example, a host could advertise available capacity for five Small VMs or three Small VMs and two medium VMs, or one GPU Large VM and two Small VMs, etc. Such a solution simplifies the challenge involved in granular representation of resources of the host. However, identifying the possible combinations of individual VMs that can be deployed in a host can be difficult with modern hosts having the resources that can seemingly support endless combinations of offerings. Moreover, when attempting to quickly and efficiently alter offerings to tenants, updates have to be made to host machines to account for a new VM offering combination.

Other systems can implement algorithms that have knowledge about the specific hardware SKU (Stock Keeping Unit) running in the cloud computing platform. The algorithms are predicated on the assumption that the hardware is homogenous in the resource specification contract that exposes resources of the host. In such a system, because the hardware SKUs are an inherent part of the algorithm, supporting new hardware SKUs and resource types necessitates substantial changes in the algorithm. Most resource specification contracts between host machines and a resource allocator also lack the capacity to expose or describe partial hardware failures. By way of example, a single disk failure out of five disks is not represented in the resource specification contract because such a contract breaks the premise of the algorithm which expects homogenous hardware on a host. As such, the allocation algorithm does not use hosts with partial failures. Further, the homogenous hardware premise can prevent the allocation algorithm from using resources owned or shared by another unrelated host, in an opportunistic manner.

Accordingly, adopting new hardware SKUs in a cloud computing platform with conventional resource allocation solutions implicates several different considerations, such as, multiple changes across an architecture stack of the cloud computing platform. Further, introducing a new offering (e.g., a simple SSD VM) would result in changes across the stack that potentially slow down the cloud computing platform provider's ability to react to new offerings. Moreover, capacity loss due to partial hardware failures can be difficult to account for when making allocation decisions. Also, dynamic scavenging of underutilized resource can result in overbooking that can necessitate real time adjustments to presumed available resources.

Embodiments of the present invention provide simple efficient methods and systems for allocating cloud computing platform resources based on a resource allocation platform that supports optimal allocation of dynamic resources using a dynamic resource protocol. The dynamic resource protocol facilitates representing physical resource capacity in logical units, where the logical units remain constant across hardware SKUs. Specifically resource capacity can be represented based on predefined logical resource types of resource, the logical resource types defined by the dynamic resource protocol. The dynamic resource protocol can be used to generate and communicate representations of resources between components of the resource allocation platform such that one or more allocators can make decisions and manage resources based on the logical resource types. Further, the allocators can be agnostic to actual hardware in the cloud computing platform.

At a high level, nodes can present available resources based on a dynamic resource protocol that facilitates representing and communicating the resources between components of a cloud computing platform. Resources generally refer to hardware resources, software resources, or other resources in a node that are abstracted into logical resource types defined in a dynamic resource protocol. In particular, the nodes use the dynamic resource protocol to expose a node resource instance that includes a resource interaction matrix that accounts for resources that are implicitly consumed when another resource in used. The dynamic resource protocol also supports representation of resources, such that, resource allocation can include heterogeneous hardware and partial failure hardware. Dynamic resource instances (e.g., user service request resource instance or node resource instance) also referred to as specification contracts that are individual representations of resources defined using the dynamic resource protocol can be used by an allocator for matching user service requests to nodes such that allocation of resources is optimized.

In operation, nodes use the dynamic resource protocol to expose resource types and a quantified amount of the resource type available as resource names and a corresponding logical unit. A host (e.g., host operating system) translates physical capacity into logical resource capacity based on the dynamic resource protocol and communicates the logical resource capacity to an allocator. The dynamic resource protocol can support key-pairs for defining and communicating physical capacity. For example, a CPU logical resource capacity can be a key-pair indicated as {CPU_MHz, 3000}. The dynamic resource protocol can specifically support node resource instances. For example, a count of a number of cores can be represented in a node resource instance. A node resource instance can also include a resource interaction matrix having a dependency matrix for applicable resources. For example, if a GPU is used, then one or more cores are disabled.

A user can also define a set of requirements based on the dynamic resource protocol. For example, a user service request resource instance can include the same resource names used in a node resource instance. It is contemplated that the user service request resource instance can include one or more of the set of available resource names (e.g., a subset of resource names). The allocator can receive a user service request (e.g., user service request resource instance). Using the dynamic resource protocol about individual resource types, an allocator can mix and match the resource types with different user service requests in order to produce an optimal placement of resources, where optimal placement of resources specifically factors the scarcity of one or more resources.

The allocator can match resources based on the resource names used in the node resource instance having the resource interaction matrix of a node to determine the actual resources that can be directed to a user service request. In this regard, the allocator can continue to be sensitive to scarcity of resources without being aware of the possible types of resources. The representation of resources based on the dynamic resource protocol supports updating virtual machine offers with substantially less work.

Embodiments of the present disclosure can support the notion of a node lending resources to other nodes. It is contemplated that a second allocator can borrow hardware based on communicating a request for hardware resources and receiving approval to use the hardware resources. The hardware resources are associated with a remote node, or in other words, a node that does not customarily support a workload of the second allocator. The second allocator can request hardware resources based on a node resource instance of the remote node. The remote node is responsible for administering resources to the second allocator, including allowing or refusing an initial approval upon the request and communicating node resource instance updates to second allocator while the second allocator supports its workload with resources from the remote node.

Embodiments described herein can further be described by way of specific examples. In one embodiment, networking resources use a resource name that corresponds to a set of resources presented by the node. The network resource name can indicate the available capacity of direct Internet Protocols (DIPs) left in a DIP pool. Nodes can also present resources based on infrastructure classification scheme (e.g., node level resources and rack levels resources). A node can present both node level resources and rack level resources. For example, a number of available DIPs at the node and a number of available DIPs in a pool of the rack. An allocator can factor a plurality of node instances and corresponding levels of resources therein, using the same network resource name when making resource allocations. By way of example, allocating a DIP on one node will therefore implicitly consume the DIP from other nodes that share the same DIP pool.

Nodes can present resources and amounts of the resource while accounting for an amount of the resource in use at any point in time. In this regard, the node can handle a wide range of conditions. For example, a loss of a single disk out of several disks on the node can be easily recognized and accounted for as a decrease in the reported available resource. Another condition can include dynamic discovery that allocated resources are underutilized, which results in an increase in available resources.

With reference specifically to the dynamic resource protocol, the dynamic resource protocol can be used to generate and communicate representation of resources between components of the resource allocation platform. The dynamic resources protocol ("protocol") identifies rules, policies, and logic for defining and communicating cloud computing resources in the cloud computing platform. The protocol can refer to an agreed upon set of elements for representing resources to support optimized allocation of resources. The protocol can be implemented using a software-based end-to-end resource allocation platform implemented as an application or service with portions thereof on a client device, an allocator device, and nodes. The protocol can support generating dynamic resource instances (e.g., user service request resource instances and node resource instances) with the corresponding user service request device and nodes.

The dynamic resource protocol can specifically support communication, of the node instance having the resource interaction matrix, from a host to an allocator. The allocator operates based on a central allocation logic. The allocator using the central allocation logic can decide which host is the best fit for placing a virtual machine. The dynamic resource protocol can enable several different protocol attributes (e.g., resource interaction matrix elements) including defining available and total resources as a set of key-value pairs. The set of key-value pairs can include specific attributes that are not known by the central allocation logic. Another protocol attribute can include defining a method to declare dependencies between the different resources. Declaring dependencies prevents over-allocation based at least on factoring these dependencies into the allocation logic. For example, resources associated with a resource type GPU also decrease the number of available CPUs in the host. The protocol enables a host to advertise available resources while excluding partial hardware failures of hardware resources supported by the host.

Moreover, the allocation logic can perform scarcity analysis for resources provided in dynamic resource instances. The allocation logic can utilize a best-fit heuristic when placing virtual machines on nodes. The protocol can support a user service request resource instance for a particular business decision-maker to describe offerings in terms of resources without implicating changes to the allocation algorithm. The protocol provides a way for various individual resource inventory managers (e.g., a network resource manager) to efficiently transport available resource information to the allocation algorithm and similarly enables efficient transport of available resources information required by an allocator.

Embodiments of described herein can further improve the allocation of resources based on a resource allocation platform. The resource allocation platform refers to integrated components using the dynamic resource allocation protocol that facilitate the optimized allocation of resources. The integrated components refer to the hardware architecture and software framework that support optimized allocation functionality using the allocation platform. The hardware architecture refers to generic physical components and interrelationships thereof and the software framework refers to software providing functionality that can be implemented with hardware operated on a device. Specifically, the hardware architecture may be generic to simplify the functionality described herein using the software framework of the allocation platform. The end-to-end software-based allocation platform can operate with the allocation platform components to operate computer hardware to provide optimized allocation functionality.

By way of example, the allocation platform can include an application programming interface (API) library that includes specifications for routines, data structures, object classes, and variables. The API library can support the interaction between the hardware architecture and the software framework of the allocation platform. These APIs include configuration specifications for the allocation platform such that user request devices, allocator devices, and nodes servers can communicate in the cloud computing platform. For example, a user service request interface may be integrated in the allocation platform to support communicating information via an interface at the user service request device and the allocator.

Accordingly, in a first embodiment described herein, a system for optimizing allocation of dynamic resources is provided. The system includes an allocator component configured for: receiving a user service request resource instance based a dynamic resource protocol, where the dynamic resource protocol supports resource instances communicated between components in a resource allocation platform; generating a resource allocation instance for the user service request resource instance based on a node resource instance, where the node resource instance is based on the dynamic resource protocol, the node resource instance comprising a resource interaction matrix that indicates one or more dependencies between resource types; and communicating the resource allocation instance for the user service request resource instance, such that, resources on the node associated with the node resource instance are allocated based on the resource allocation instance.

The system further includes a host component configured for: generating the node resource instance based on the dynamic resource protocol; communicating the node resource instance to the allocator component; receiving the resource allocation instance based on the node resource instance; and allocating node resources based on the resource allocation instance.

In a second embodiment described herein, a computer-implemented method for optimizing allocation of dynamic resources is provided. The method includes receiving a user service request resource instance based a dynamic resource protocol, where the dynamic resource protocol supports resource instances communicated between components in a resource allocation platform. The method also includes generating a resource allocation instance for the user service request resource instance based on a node resource instance, where the node resource instance is based on the dynamic resource protocol, the node resource instance comprising a resource interaction matrix. The method further includes communicating the resource allocation instance for the user service request instance, such that, resources of a node associated with the node resource instance are allocated based on the resource allocation instance.

In a third embodiment described herein, one or more computer storage media having computer-executable instructions embodied thereon that, when executed, by one or more processors, causes the one or more processors to perform a method for optimizing dynamic resources is provided. The method includes generating a node resource instance having a resource interaction matrix, where the node resource instance is based on a dynamic resource protocol. The method also includes communicating the node resource instance to an allocator component. The method further includes receiving a resource allocation instance based on the node resource instance. The method includes allocating node resources based on the resource allocation instance.

Figure 1B:
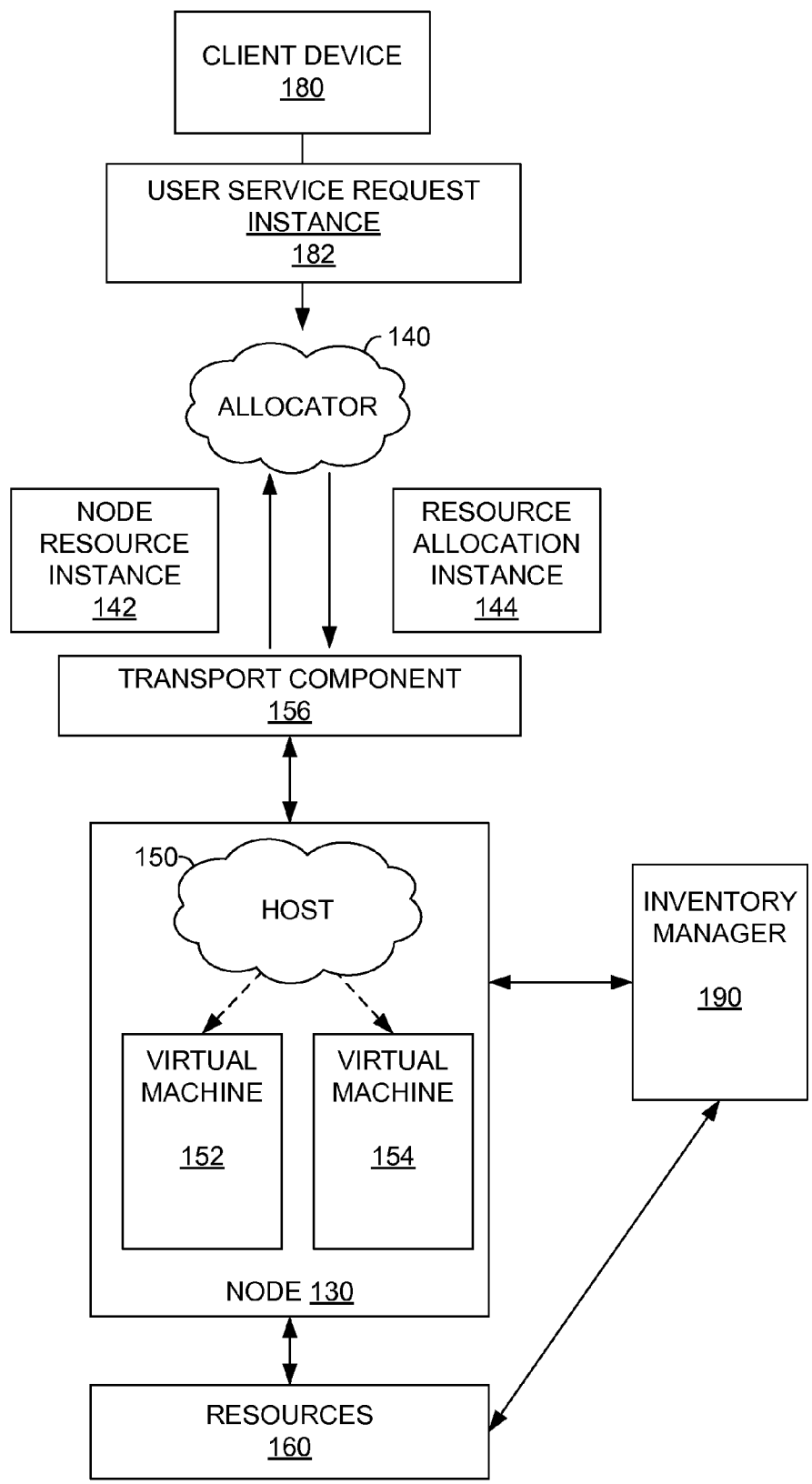

Referring now to FIGS. 1A and 1B, FIG. 1A illustrates an exemplary distributed computing environment 100 in which implementations of the present disclosure may be employed. In particular, FIG. 1A shows a high level architecture of the resource allocation platform system ("allocation system") comprising a cloud computing platform 110, where the allocation system supports communicating using a dynamic resource protocol in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 100 that includes the cloud computing platform 110, rack 120, and node 130 (e.g., computing devices, processing units, or blades) in rack 120. The allocation system can be implemented with a cloud computing platform 110 that runs cloud services across different data centers and geographic regions. The cloud computing platform 110 can implement an allocator 140 component for provisioning and managing resource allocation, deployment, upgrade, and management of cloud services. Typically, the cloud computing platform 110 acts to store data or run service applications in a distributed manner. The cloud computing platform 110 in a data center can be configured to host and support operation of endpoints of a particular service application. The cloud computing platform 110 may be a public cloud, a private cloud, or a dedicated cloud.

The node 130 can be provisioned with a host 150 (e.g., operating system or runtime environment) running a defined software stack on the node 130. Node 130 can also be configured to perform specialized functionality (e.g., compute nodes or storage nodes) within the cloud computing platform 110. The node 130 is allocated to run one or more portions of a service application of a tenant. A tenant can refer to a customer utilizing resources of the cloud computing platform 110. Service application components of the cloud computing platform 110 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the node 130, the node may be partitioned into virtual machines (e.g., virtual machine 152 and virtual machine 154). Physical machines can also concurrently run separate service applications. The virtual machines or physical machines can be configured as individualized computing environments that are supported by resources 160 (e.g., hardware resources and software resources) in the cloud computing platform 110. It is contemplated that resources can be configured for specific service applications. Further, each service application may be divided into functional portions such that each functional portion is able to run on a separate virtual machine. In the cloud computing platform 110, multiple servers may be used to run service applications and perform data storage operations in a cluster. In particular, the servers may perform data operations independently but exposed as a single device referred to as a cluster. Each server in the cluster can be implemented as a node.

Client device 180 may be linked to a service application in the cloud computing platform 110. The client device 180 may be any type of computing device, which may correspond to computing device 800 described with reference to FIG. 8, for example. The client device 180 can be configured to issue commands to cloud computing platform 110. In embodiments, client device 180 may communicate with service applications through a virtual Internet Protocol (IP) and load balancer or other means that directs communication requests to designated endpoints in the cloud computing platform 110. The components of cloud computing platform 110 may communicate with each other over a network (not shown), which may include, without limitation, one or more local area networks (LANs) and/or wide area networks (WANs).

Having described various aspects of the distributed computing environment 100 and cloud computing platform 110, it is noted that any number of components may be employed to achieve the desired functionality within the scope of the present disclosure. Although the various components of FIG. 1A are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Turning to FIG. 1B, FIG. 1B illustrates additional components within a resource allocation platform system that facilitate performing functionality described herein. Among other components not shown, the resource allocation platform system includes node 130, allocator 140, host 150, transport component 156, resources 160, client device 180, and inventory manager 190. Advantageously, embodiments described herein support dynamic resource instances communicated between nodes and an allocator such that the allocator can make decisions based solely on logical resources exposed in node resource instances. The node resources can be generated by host 150 that has control over the hardware and generates abstractions of the resources (e.g., hardware resources and OS resources) away from this physical attributes based on the dynamic resource protocol. As such, changes to an allocator will no longer be needed to adopt new hardware resources faster in a safe and reliable manner, and the allocator can be a pure global placement function, agnostic to specific hardware SKUs.

With continued reference to FIG. 1B, the client device 180 can be configured to generate and communicate a user service request. The user service request can be communicated as a user service request instance 182. A request translation component (not shown) is responsible for communicating with the client device to receive the user service request. It is contemplated that the user service request can be translated into the user service request instance 182. In particular, the user service request instance is generated based on the dynamic resource protocol such that the user service request resource instance 182 indicates a set of requirements in terms of logical resources (e.g., resource names and logical units) described in the dynamic resource protocol. The user service request resource instance 182 can be communicated to the allocator. The allocator, in between, uses a node resource instance to produce close-to-optimal placement decisions for requested resources.

The host 150 is responsible for managing, tracking, and communicating node resources. The host 150 can control local hardware resources based on dynamic workloads on the host 150. The host 150 can take optimal local decisions about the local resources. For example, the host can make decisions based on the physical resource layout (e.g., a disk configuration or multi-level storage). In particular, the host 150 can choose not to advertise unhealthy or faulted resource (e.g., a failed disk) such that the faulted resource is not considered in new allocation decisions. The host 150 can also define logical resources at various levels of granularity. The host 150 can advertise logical resources in a node resource instance. The node resource instance in one embodiment can include VM types that can be hosted (e.g., X-small, large, etc.) and in another embodiment the host can advantageously advertise logical resource in terms of ACUs, storage, capacity, NIC bandwidth etc. As such, the host 150 can be agnostic to different cloud computing infrastructure offerings.

The host 150 and one or more individual inventory managers (e.g., inventory manager 190) can be responsible for resource accounting. The inventory manager 190 is responsible for a classification of resources. In this regard, the inventory manager can define resources as a particular logical resource type within a classification of resources. For example, a network service manager can be responsible for a plurality of DIPs on a node or a shared pool of DIPs for a plurality of hosts. Resource accounting can refer to tracking available resources and current utilization at the resources. As such, resources can be tracked at the host level and also at each inventory manager level. The host and the inventory manager account for resources that can be communicated independently or in communication to the allocator 140. In this regard, it is contemplated that an inventory manager may generate an inventory manager resource instance in accordance with embodiments described herein.

The host 150 is responsible for persisting the existing container allocations in the host 150. The host 150 can further perform resource accounting to keep track of the available resource capacity of the node. For example, the node can provide an inventory of resources when requested. The host 150 can also update resource accounting based on the state of the hardware. The host 150 is also responsible for informing over-allocation faults by marking containers as faulted with a well-known error code. Upon receiving a resource allocation instance from the allocator 140 the host allocates resources (e.g., containers) as indicated in the resource allocation instance. This reduces the risk of over-allocation and enables the allocator 140 to perform global scarce resource allocation.

The allocator 140 can be configured to make decisions for resource allocations for user service requests based on node resource instances. The allocator 140 can utilize the node resource instances along with a central logic in making decisions. The node resource instance 142 can refer to a resource abstraction that is decoupled from the physical hardware that is represented using the dynamic resource protocol. Making decisions based on the node resource instances enables easier adoption of new hardware SKUs in the cloud computing platform. It is contemplated the allocator 140 does not persist the state of the resources in the cloud computing platform, however, the allocator 140 can maintain the in-flight allocation decisions in memory in order to take in-flight allocations into consideration when making more decisions.

In operation, the allocator 140 can receive a user service request resource instance 182 and match the user service request resource instance 182 to node resource instances in order to generate a resource allocation instance 144 for the user service request instance 142. The allocator 140 can re-compute inventory after an allocation decision and synchronize the inventory with inventory information coming from host 150 in order to understand which decisions have not reached the host 150. This can enable the host 150 to advertise more capacity as it becomes available or as faults occur. It is contemplated that the allocator 140 does not make decisions that rely on specific hardware resources or knowledge thereof, the decisions are made on advertised resources in the node resource instance 142. The allocator 150 can also be configured to perform resource scarcity analysis based on a resource interaction matrix and resource weights of a node resource instance to do close-to-optimal placements.

It is contemplated that the host 140 and the allocator 140 can be configured to be backward compatible to existing components in the cloud computing platform. The dynamic resource instances (e.g., node resource instance 142 and resource allocation instance 144) involve making configurations in both the allocator 140 (to rely solely in the resources being exposed) and the host 150 (to advertise the logical resources and translate them into physical descriptions). The configurations can be fully backwards compatible with the existing allocation decisions as they are rolled out in the cloud computing platform 110.

The dynamic resource protocol can be used to define resource instances (e.g., user service request instance and node resource instance). Table 1 contains a description of the information that dynamic resource protocol can support. An inventory contract (e.g., a node resource instance) can be generated having the following information of a corresponding node and communicated to the allocator 140. FIG. 2 illustrates an example of a node resource instance having a resource interaction matrix based on resource interaction matrix attributes defined in the dynamic resource allocation protocol. Additional details on the resource interaction matrix attributes are described below. The allocator 140 can receive a plurality of node resource instances and utilize the node resource instances to make allocation decisions.

The dynamic resource protocol supports multi-level storage representation. For example, the additional SSD media type added in hardware (e.g., Gen-3 hardware) and cloud computing platform functionality provide the opportunity to represent a set of disks of multiple media types (SSD, HDD) as a multi-level storage array. In a possible implementation, the fastest (and smallest) media is used as a level zero storage and falls back to the next level (slower, larger) after certain conditions are met; the same pattern applies for subsequent levels in the array. A multi-level store can be

TABLE 1

| Information | Definition | Type |
|---|---|---|
| Total Allocable Capacity | Total capacity managed by the host. The total capacity can exclude system capacity (required for operating the host) or unusable resources (such as faulted). | List of key value pairs |
| Free Allocable Capacity | List of resources that can be used for allocating future services. The list of resources can exclude system or unusable resources. It is contemplated that the value is always less than or equal to 'Total Allocable Capacity.' If 'Free Allocable Capacity' is equal to 'Total Allocable Capacity,' the node is considered to be free. | List of key value pairs |
| Dependency Matrix | Table that represents dependencies between different resource types. A quick example of such dependency is that consuming one logical unit of resource 'A' requires taking two logical units of resource 'B'. Nested Dependencies may not be supported. For instance, when taking the two logical units of resource 'B', the dependencies of resource 'B' must not be processed by consumers of this matrix. | Table of functions |
| Existing Allocations | A list of all the containers deployed in the host along with the specific per-resource capacity consumed by each container. This is used by the allocation component to track which resources to remove from its free allocable capacity estimations after a container deletion is decided. This information can include utilized resources that are not owned by the host, but shared across multiple hosts instead. | Table of containers vs resources used |
| Shared Resources Pools | A set of pointers to capacity tables about shared resources. | List of ids |

The information above can be synchronized constantly between the allocator 140 and the host 150 in order for the allocator 140 to have an up-to-date view of the existing resources when taking placement decisions. The source of this information is the host 150, the allocator 140 can re-estimate the information after each decision to avoid unintended over-allocation. The allocator 140 can contrast the information received from the host 150 with the most recent decisions taken in order to rationalize those placements that have not yet made it to the target host and do proper accounting estimations.

The dynamic resource protocol can further support unintended over-allocation and intentional over-allocation scenarios. With reference to unintended over-allocation, the dependency matrix supports recalculating the free allocable capacity after an allocation decision has been taken and until the next inventory synchronization. This reduces the risk of inadvertently over-allocating, as the allocator will have an estimate of the node utilization. The risk is not removed completely due to a number of factors such as partial amnesia and diminished capacity because of hardware faults. With reference to intentional over-allocation, the design enables intentional over-allocation by giving the host 150 the freedom to advertise more logical resources than available.

represented in the dependency matrix by specifying each level as a different resource type and ensuring that the free allocable capacity advertised for a given level can be used to fulfill allocation requests with minimum per-level storage capacities. For example, in the case of an empty node that has 512 GB of SSD (level 0) and 2048 GB of HDD (level 1), the advertised free allocable capacity would be 512 GB and 2048 GB for Level 0 and Level 1 respectively with a total advertised storage capacity of 2560 GB. Allocation requests can specify a minimum required capacity of levels L0, L1 and total storage. The difference between [L0+L1] and the total storage is the spill-over, which an operating system decides how to implement by using any of the available media or going to an auxiliary storage. Note that the above applies to any resource that can be represented as a multi-level store. Disk storage is not a special case, since each level is a different logical resource.

The dynamic resource protocol further supports a dependency matrix function. It is possible that not all dependencies might be expressed as a function that decrements the capacities linearly. For example, there is a possibility that once a resource is used by an allocation order, some other resource capacity is set to zero. The ability to express capacity dependencies as a function can be implemented when such dependencies exist.

The dynamic resource protocol also supports a degraded state functionality. A degraded state refers to a state where some resources (e.g., hardware resources) are put out of rotation. When appropriate, hosts can work on a degraded state by not including certain hardware resources, this can decrease free and total allocable capacities for the set of logical resources related to the hardware. As a result, the allocator 140 naturally avoids placing allocation orders for customer deployments in the faulted hardware because the faulted hardware is no longer advertised by the host. In the case of hardware that faults after a container has already been allocated and started, the host can work to understand if a container migration needs to happen or if the container is to remain using the faulted hardware. If out-of-place recovery is required, the container can be marked as faulted and the faulty hardware is no longer advertised, so that the allocator 140 can choose to re-allocate to a different host when migration is triggered.

The dynamic resource protocol supports shared resource pools. Some of the resources that need to be allocated to a single host are part of shared resource pools. For example, the pool of available IP Addresses assignable to virtual machines is prone to span across multiple hosts and be managed by the network service manager. As such, hosts can report utilization of such resources as inventory is synchronized, along with pointers to the free and total allocable capacity table of the shared resources. The allocator 140 can use the free and total allocable capacity tables provided the owner of such resources when taking placement decisions. By way of example, a host can advertise that it is using x IP Addresses and provides a pointer to resource capacity table guid1. Capacity table guid1 is provided by the network service manager and specifies that there are a total of y IP Addresses and z are free. The allocator 140 decreases z by 1 when estimating capacity if the host is selected for the current request.

The dynamic resource protocol can support resource weights. There exist business scenarios in which the scarcity analysis made by the allocator 140 on top of the resource interaction matrix may impact the total capacity of highly scarce resources (typically specialized and expensive). By way of example, a hardware resource such as a GPU may have been designated in a business decision as a replacement for CPUs only once the number of available CPU capacity reaches some low threshold (e.g., 5%). Without any operational control, an allocator 140 will likely use the GPUs way before the number of CPUs remaining reaches 5% as it allocates more containers. Embodiments described herein support adding per-resource weight as an operational control that hints the allocator 140 about the business decision made about GPUs. A resource weight can be defined as an integer value in the range of [0-100] where lower values indicate less scarcity. In the example outlined, a high value can be indicated for the "CPU" resource like 95 and a low value to the "GPU" resource, like 5. The resource weight is not to be communicated or controlled by the host. This is an operational control internal to the allocator 140 that is be changed based on business decisions in order to affect the final allocation decision.

Transport component 156 can be configured to handle communication of node resource instances in an efficient manner. The node can support compute that evolves into a component that can handle hundreds of thousands of VMs assigned to one allocator, the network requirements of the node resource instance having a resource interaction matrix can become an area of concern. As such, the transport component 156 can be implemented to support serializing information exchanged by providing only deltas (i.e., changes or alterations) in each document and avoiding (e.g., identifying and excluding) emitting repetitive information such as resources with zero capacity. The allocator 140 can also be implemented with maximums to meet service level agreements in terms of memory, network and CPU consumption. As such, some exemplary limits to aspects of the node resource instance so that the allocator can meet its SLAs are shown below in Table 2.

TABLE 2

| Limit | Value | Notes |
| --- | --- | --- |
| Resource capacity range | Integer, any value from zero to $2^{32}$ (32 bit word) | No floating point values to keep the design and Math simple. |
| Maximum number of resource types advertised | 32 | Establishes a maximum boundary on the amount of memory required by the Allocator to store the resource matrix. (We expect to have one allocator serve up to 150,000 nodes, so this limit establishes less than 2 GB of memory required). |

Turning now to FIG. 3, FIG. 3 illustrates the physical description of an exemplary hardware resource (e.g., Gen-3 Compute Hardware). FIGS. 4A-4C illustrate a modified version of a Gen-3 compute container configuration that enumerates the resources by the different offerings as labels. The offerings are examples of predefined user service requests that can be selected by a user making a request for resources. These offerings can be exposed to users who identify one or more different offerings to meet their business objectives. FIG. 4A includes several standard and high memory offerings, FIG. 4B includes basic virtual machine offerings and FIG. 4C includes solid state disk virtual machine offerings, each set of offerings can include at least a subset of resource types (e.g., resource labels) available in the dynamic resource protocol.

It is contemplated that offerings may not include all resources used in the dynamic resource protocol. A subset of resources can be publicly exposed in different offerings; however, the implementation of the offering can include additional resource types that are factored into resource allocation. By way of example, a particular resource type can be capable of being locked during usage by an operating system service or application; as such, the resource type is a valuable factor in scarcity analysis prior to resource allocation. As implemented herein, such a resource type may or may not be a publicly exposed resource in an offering.

Turning now to FIGS. 5A and 5B, FIGS. 5A and 5B illustrate tables that expose the total and free allocable capacity and the dependency matrix advertised by a host based on the dynamic resource protocol. By way of example, the matrices are based on the physical description of the Gen-3 hardware and assume no multi-level storage is implemented. Further, the free allocable capacity is calculated assuming no VMs are deployed in the node.

Embodiments of the present disclosure can also be described with reference to a case study. The case study can involve a cloud computing provider rolling out a new offering called Bargain-GPUs. A 'bargain' GPU is a software-based GPU that provides virtually the same matrix operations and parallel computing capabilities that standard GPUs can provide today, but at a cost in performance, which also brings a reduction in price. As such, the dynamic resource protocol can be updated to include a virtual GPU resource type. The virtual GPU resource type can be incorporated into the matrix design such that allocating one unit of the virtual GPU directly reduces the amount of CPU available in the host by two. Or in order to maximize for capacity a resource allocator can allocate an actual GPU but the GPU is throttled in order to meet the performance consistency requirements of the offering. In addition, the GPU can be implemented as a weighted resource. For example, because GPUs are considered a more expensive, specialized resource than CPUs, a weight value of '5' can be assigned to the 'GPU' resource type and a weight of '95' can be assigned to the 'CPU' resource. The result is that GPUs are only allocated for bargain GPU offerings when CPU availability has become very scarce.

Figure 6:
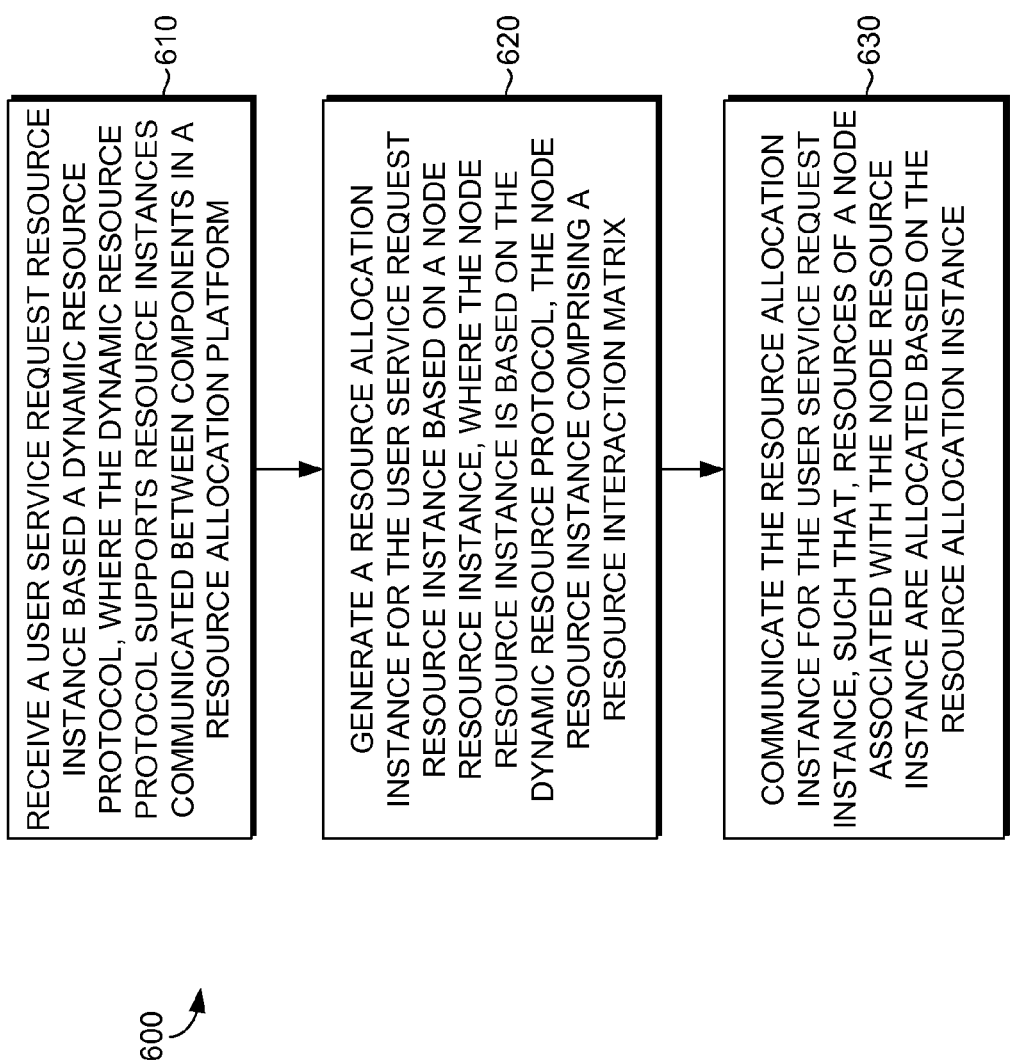
FIG. 6 is a flow diagram showing an exemplary method for optimizing resource allocation based on a dynamic resource protocol, in accordance with embodiments described herein.

Turning now to FIG. 6, a flow diagram is provided that illustrates a method 600 for optimizing allocation of dynamic resources. Initially at block 610, a user service request resource instance based a dynamic resource protocol is received. The dynamic resource protocol supports resource instances communicated between components in a resource allocation platform. At block 620, a resource allocation instance for the user service request resource instance is generated based on a node resource instance. The node resource instance is based on the dynamic resource protocol, the node resource instance comprising a resource interaction matrix. At block 630, the resource allocation instance for the user service request instance is communicated, such that, resources of a node associated with the node resource instance are allocated based on the resource allocation instance.

Figure 7:
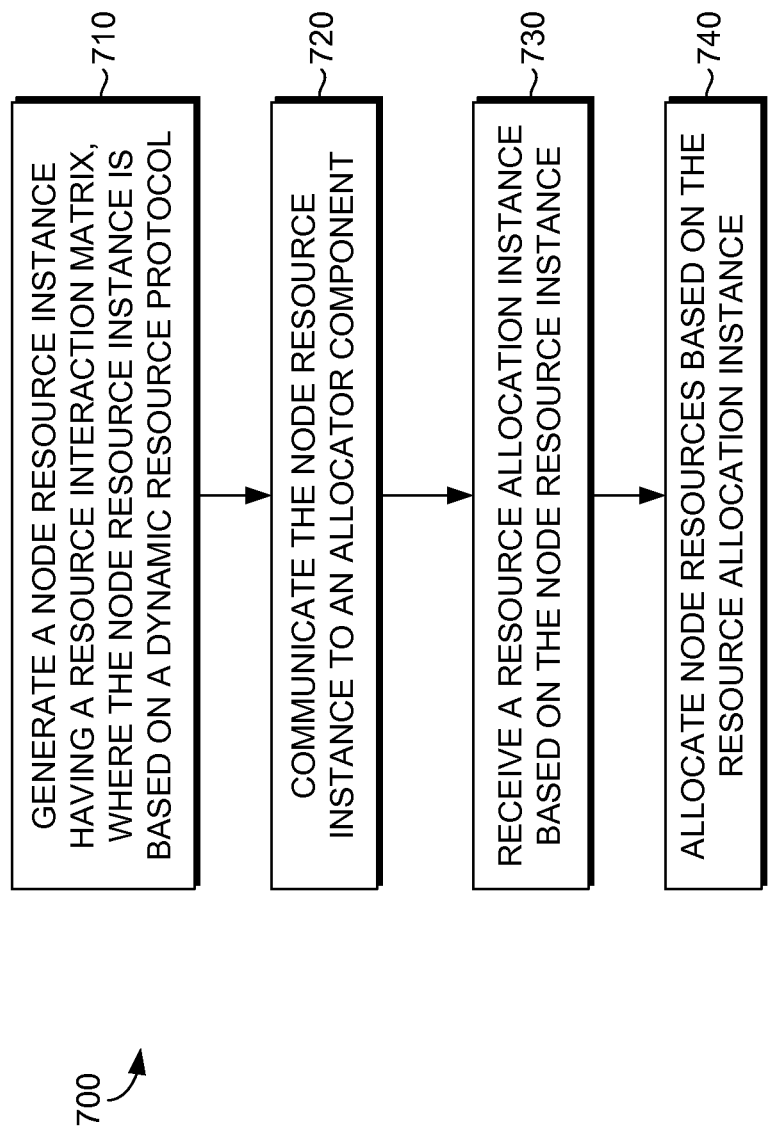
FIG. 7 is a flow diagram showing an exemplary method for optimizing resource allocation based on a dynamic resource protocol, in accordance with embodiments described herein.

Turning now to FIG. 7, a flow diagram is provided that illustrates a method 700 for optimizing dynamic resources. Initially at block 710, a node resource instance having a resource interaction matrix is generated. The node resource instance is based on a dynamic resource protocol. At block 720, the node resource instance is communicated to an allocator component. At block 740, a resource allocation instance is received based on the node resource instance. At block 750, node resources are allocated based on the resource allocation instance.

Figure 8:
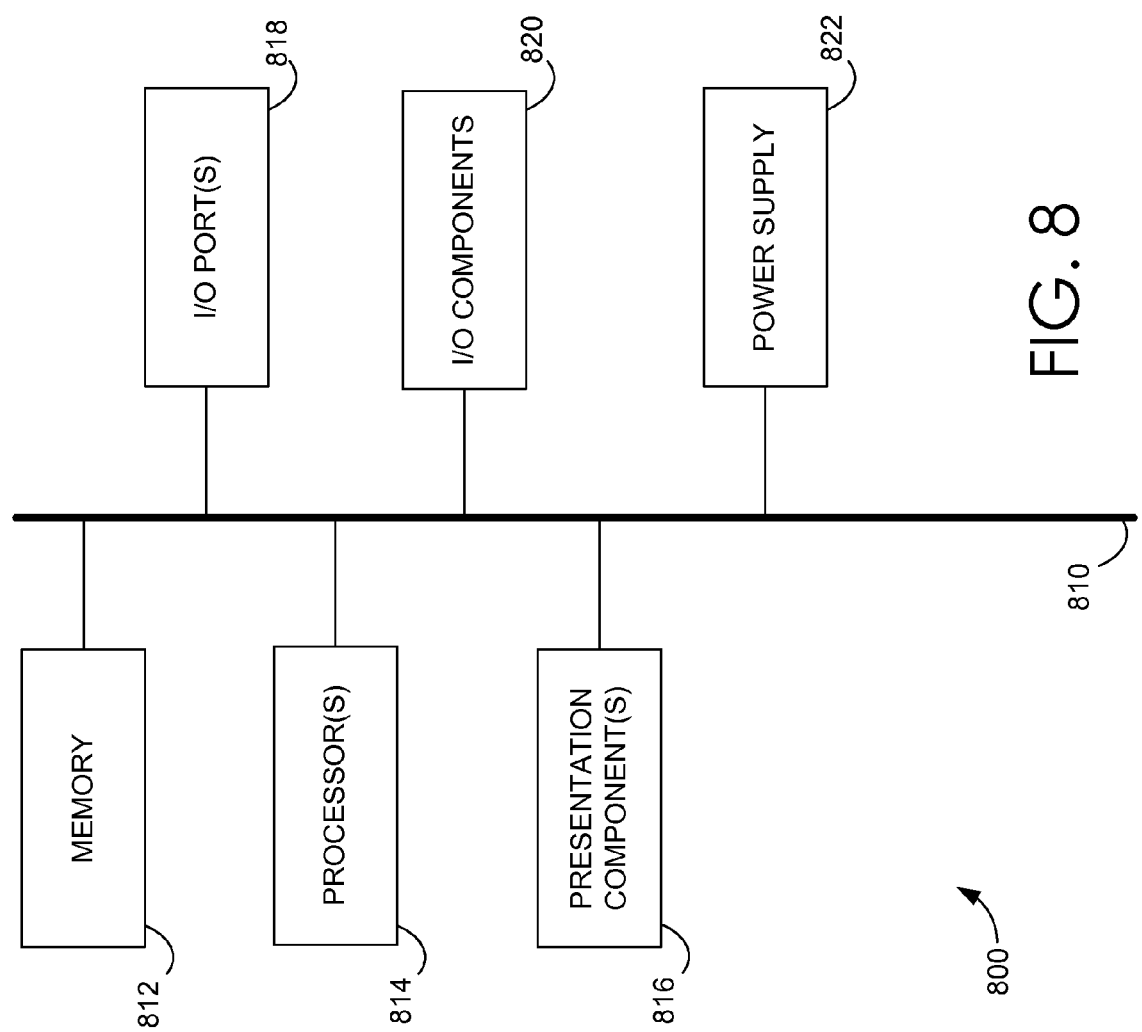
FIG. 8 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for optimizing allocation of dynamic resources, the system comprising:
   one or more hardware processors and memory storing computer-executable instructions and components embodied thereon that, when executed, by the one or more hardware processors, cause one or more the hardware processors to execute:
   an allocator component configured for:
   receiving a user service request resource instance based a dynamic resource protocol, wherein the dynamic resource protocol supports resource instances communicated between components in a resource allocation platform, wherein the dynamic resource protocol defines a set of rules for representing resource interaction matrices based on resource interaction matrix elements, the resource interaction matrix elements comprising one or more of the following:
      a total allocable capacity of resource types;
      a free allocable capacity of resource types;
      a dependency matrix that represent dependencies between resource types;
      an existing resource allocation capacity for resource types; and
      a shared resource pool;
   generating a resource allocation instance for the user service request resource instance based on a node resource instance, wherein the node resource instance is based on the dynamic resource protocol, the node resource instance comprising a resource interaction matrix that indicates one or more dependencies between resource types;
   communicating the resource allocation instance for the user service request resource instance, such that, resources on a node associated with the node resource instance are allocated based on the resource allocation instance; and
   a host component configured for:
   generating the node resource instance based on the dynamic resource protocol;
   communicating the node resource instance to the allocator component;
   receiving the resource allocation instance based on the node resource instance; and
   allocating node resources based on the resource allocation instance.

2. The system of claim 1, further comprising a request translation component configured for translating a user service request to the user service request resource instance based on the dynamic resource protocol, wherein the user service request resource instance comprises logical resource names defined in the dynamic the resource protocol.

3. The system of claim 1, further comprising an inventory manager configured for:
   defining resources as logical resource types based on the dynamic resource protocol, wherein the resources of an inventory manager are associated with a classification of the resources;
   tracking resource capacity of logical resources types as logical units; and
   communicating the logical resource types and logical units for the resources.

4. The system of claim 1, further comprising a transport component configured for:
   serializing information on node resource instances by providing deltas in each node resource instance; and
   identifying and excluding repetitive information in node resource instances.

5. The system of claim 1, wherein the dynamic resource protocol further defines the set of rules for representing partial failure hardware resources as logical resource capacity for the node.

6. The system of claim 1, further comprising a second allocator component configured for:
   referencing the node resource instance of the host, wherein the host corresponds to the allocator component, the host is a remote host of the second allocator component; and
   generating a remote resource allocation instance for the remote host based on an approved request for one or more resources of the remote host, wherein the remote resource allocation instance is based on the node resource instance.

7. A computer-implemented method for optimizing allocation of dynamic resources, the method comprising
   receiving a user service request resource instance based a dynamic resource protocol, wherein the dynamic resource protocol supports resource instances communicated between components in a resource allocation platform, wherein the dynamic resource protocol defines a set of rules for representing resource interaction matrices based on resource interaction matrix elements, the resource interaction matrix elements comprising one or more of the following:
      a total allocable capacity of resource types;
      a free allocable capacity of resource types;
      a dependency matrix that represent dependencies between resource types;
      an existing resource allocation capacity for the resource types; and
      a shared resource pool;

generating a resource allocation instance for the user service request resource instance based on a node resource instance, wherein the node resource instance is based on the dynamic resource protocol, the node resource instance comprising a resource interaction matrix; and communicating the resource allocation instance for the user service request resource instance, such that, resources of a node associated with the node resource instance are allocated based on the resource allocation instance.

8. The method of claim 7, wherein the user service request resource instance comprises resource types of the dynamic resource protocol, wherein the dynamic resource protocol supports dynamic resource allocation for dynamic workloads on allocators and nodes.

9. The method of claim 7, wherein generating the resource allocation instance further comprises:

matching the user service request resource instance to the node resource instances based on logical resource types; and determining that the node resource instance satisfies the user service request resource instance based on logical units requested in the user service request instance and logical units in the node resource instance.

10. The method of claim 7, wherein generating the resource allocation instance further comprises:

performing a scarcity of resources analysis based on the node resource instance; and generating the resource allocation instance based at least in part on a best-fit heuristic.

11. The method of claim 7, wherein the dynamic resource protocol further includes a set of rules for representing resource weights, wherein a resource weight is an operational control that indicates scarcity of a resource type.

12. One or more computer storage media having computer-executable instructions embodied thereon that, when executed, by one or more processors, causes the one or more processors to perform a method for optimizing dynamic resources, the method comprising:

generating a node resource instance having a resource interaction matrix, wherein the node resource instance is based on a dynamic resource protocol, wherein the dynamic resource protocol defines a set of rules for representing in the resource interaction matrix heterogeneous hardware resources and partial failure hardware resources as logical resource capacity for the node;

communicating the node resource instance to an allocator component;

receiving a resource allocation instance based on the node resource instance; and allocating node resources based on the resource allocation instance.

13. The method of claim 12, wherein generating the node resource instance further comprises referencing one or more inventory manager resource instances, wherein an inventory manager resource instance comprises logical resource capacity of resource types controlled using the inventory manager.

14. The method of claim 12, wherein generating the node resource instance further comprises:

identifying a partial fault associated with a selected resource type; and excluding partial faults of the selected resource type from the node resource instance, wherein the node resource instance includes non-fault portions of the selected resource type and excludes fault portions of the selected resource type.

15. The method of claim 12, wherein the dynamic resource protocol defines a set of rules for translating and representing hardware resources as logical resource capacity comprising logical resource types and logical units, wherein the logical resource types remain constant across a plurality of hardware stock keeping units (SKUs) for heterogeneous hardware.

16. The method of claim 12, wherein the dynamic resource protocol further includes the set of rules for representing the resource interaction matrix based on resource interaction matrix elements, the resource interaction matrix elements comprising one or more of the following:

a total allocable capacity of resource types;

a free allocable capacity of the resource types;

a dependency matrix that represent dependencies between resource types;

an existing resource allocation capacity for the resource types; and a shared resource pool.

17. The method of claim 16, wherein the dependency matrix facilitates representing multi-level storage, wherein each storage level is represented as a different resource type, wherein free allocable capacity for each storage level fulfills allocations requests with minimum per-level storage capacity.

18. The method of claim 16, wherein the shared resource pool corresponds to a plurality of hosts on nodes, wherein each host reports shared resource utilization of a shared resource in the shared resource pool, wherein the shared resource utilization comprises a pointer to a free allocable capacity and total allocable capacity of the shared resource.

19. The method of claim 16, further comprising:

updating the dependency matrix based on the resource allocation instance; and recalculating a free allocable capacity of hardware resources based on the resource allocation instance, wherein recalculating the free allocable capacity comprises referencing the dependency matrix of the hardware resources.

20. The method of claim 12, further comprising:

updating an existing resource allocation record based on the resource allocation instance; and persisting the updated existing resource allocation record for reference during resource accounting operations.

* * * * *